(12) United States Patent
Russell

(10) Patent No.: US 8,826,422 B2
(45) Date of Patent: Sep. 2, 2014

(54) METHODS, SYSTEMS, AND COMPUTER PROGRAM PRODUCTS FOR DETECTING AND MITIGATING FRAUDULENT MESSAGE SERVICE MESSAGE TRAFFIC

(75) Inventor: Travis E. Russell, Clayton, NC (US)

(73) Assignee: Tekelec Global, Inc., Morrisville, NC (US)

( * ) Notice: Subject to any disclaimer, the term of this patent is extended or adjusted under 35 U.S.C. 154(b) by 1237 days.

(21) Appl. No.: 11/639,446

(22) Filed: Dec. 14, 2006

(65) Prior Publication Data
US 2007/0133602 A1 Jun. 14, 2007

Related U.S. Application Data

(60) Provisional application No. 60/750,289, filed on Dec. 14, 2005.

(51) Int. Cl.
| | | |
|---|---|---|
| *G06F 21/00* | (2013.01) | |
| *H04L 29/06* | (2006.01) | |
| *H04Q 3/00* | (2006.01) | |
| *H04L 12/58* | (2006.01) | |
| *H04M 3/42* | (2006.01) | |
| *H04M 3/436* | (2006.01) | |

(52) U.S. Cl.
CPC ....... *H04L 63/1416* (2013.01); *H04M 2201/12* (2013.01); *H04L 69/169* (2013.01); *H04L 69/16* (2013.01); *H04Q 3/0029* (2013.01); *H04L 12/585* (2013.01); *H04L 51/12* (2013.01); *H04M 3/436* (2013.01); *H04M 2201/18* (2013.01); *H04M 2201/14* (2013.01); *H04M 3/42382* (2013.01)
USPC ............... 726/22; 726/28; 713/182; 709/217; 709/225

(58) Field of Classification Search
USPC .......................................... 726/22; 455/466
See application file for complete search history.

(56) References Cited

U.S. PATENT DOCUMENTS 5,987,508 A * 11/1999 Agraharam et al. .......... 709/217
6,738,647 B1 * 5/2004 Link, II ........................ 455/564

(Continued)

FOREIGN PATENT DOCUMENTS

| EP | 1 482 696 A1 | 12/2004 |
| JP | 2003 125005 A | 4/2003 |

OTHER PUBLICATIONS

Notification Concerning Transmittal of International Preliminary Report on Patentability for International Application No. PCT/US2006/047644 (Oct. 23, 2008).
Notification of Transmittal of the International Search Report and the Written Opinion of the International searching Authority, or the Declaration for International Application No. PCT/US2006/047644 (Sep. 10, 2008).

(Continued)

*Primary Examiner* — Morshed Mehedi
(74) *Attorney, Agent, or Firm* — Jenkins, Wilson, Taylor & Hunt, P.A.

(57) ABSTRACT

Methods, systems, and computer program products for detecting fraudulent message service message traffic are disclosed. According to one method, message service messages are monitored. It is determined that the message service message traffic indicates that the message service message traffic is fraudulent based on detection of at least one of: 1) message service message traffic received at a first network from a second network, where the traffic includes at least one message with an SCCP calling party address internal to the first network, 2) a volume of message service message traffic received at the first network from the second network that exceeds the volume of message service message traffic sent by the first network to the second network by a threshold amount, and 3) message service message traffic that is sent to a dark number. In response to detecting fraudulent message service message traffic, a mitigating action is performed.

7 Claims, 13 Drawing Sheets

(56) References Cited

U.S. PATENT DOCUMENTS

| | | | |
|---|---|---|---|
| 7,089,592 B2* | 8/2006 | Adjaoute | 726/25 |
| 7,451,487 B2* | 11/2008 | Oliver et al. | 726/24 |
| 2002/0183081 A1* | 12/2002 | Elizondo Alvarez | 455/466 |
| 2003/0050984 A1* | 3/2003 | Pickup et al. | 709/206 |
| 2003/0083078 A1* | 5/2003 | Allison et al. | 455/466 |
| 2003/0131063 A1 | 7/2003 | Breck | |
| 2003/0228008 A1* | 12/2003 | Betts et al. | 379/192 |
| 2003/0229534 A1* | 12/2003 | Frangione et al. | 705/10 |
| 2004/0023676 A1* | 2/2004 | Lee | 455/466 |
| 2004/0235502 A1* | 11/2004 | Kim | 455/466 |
| 2004/0260778 A1* | 12/2004 | Banister et al. | 709/206 |
| 2005/0043011 A1* | 2/2005 | Murray et al. | 455/405 |
| 2005/0259667 A1* | 11/2005 | Vinokurov et al. | 370/401 |
| 2007/0129054 A1* | 6/2007 | Andronikov et al. | 455/404.2 |
| 2007/0281718 A1* | 12/2007 | Nooren | 455/466 |
| 2008/0004049 A1* | 1/2008 | Yigang et al. | 455/466 |

OTHER PUBLICATIONS

Communication of European publication number and information on the application of Article 67(3) EPC for Application No. 05845379.4 (Aug. 20, 2008).

Decision of Rejection for Chinese Patent Application No. 200680052749.4 (Dec. 26, 2012).

Extended European Search Report for European Patent Application No. 06845379.4 (Oct. 6, 2011).

Buehler, "Blocking of SMS Spam and Fraud White Paper," XP55007430 (May 31, 2004).

"XP000002659527," Database EPODOC, European Patent Office (Apr. 25, 2003).

Chinese Official Action for Chinese Application No. 200680052749.4 (May 10, 2010).

* cited by examiner

| SCCP CALLING PARTY ADDRESS TABLE | | |
|---|---|---|
| LINKSET | SCCP CALLING PARTY ADDRESS | ACTION |
| 1 | 85290100001 | ALLOW |
| 1 | 12345678911 | BLOCK |

FIG. 6

| MSM EGRESS / INGRESS TABLE | | | | | |
|---|---|---|---|---|---|
| NETWORK ID | MSM INGRESS COUNT | MSM EGRESS COUNT | DISPARITY THRESHOLD | TIME PERIOD | ACTION |
| NETWORK 1 | 34563 | 167,000 | 1000 | 30 MINUTES | ALARM |
| NETWORK 2 | 99999 | 100,000 | 1000 | 45 MINUTES | ALLOW |

FIG. 11

METHODS, SYSTEMS, AND COMPUTER PROGRAM PRODUCTS FOR DETECTING AND MITIGATING FRAUDULENT MESSAGE SERVICE MESSAGE TRAFFIC

RELATED APPLICATIONS

This application claims the benefit of U.S. Provisional Patent Application Ser. No. 60/750,289, filed Dec. 14, 2005; the disclosure of which is incorporated herein by reference in its entirety.

TECHNICAL FIELD

The subject matter described herein relates to identifying fraudulent message service message traffic. More particularly, the subject matter described herein includes methods, systems, and computer program products for detecting and mitigating fraudulent message service message traffic.

BACKGROUND

Message service messaging, such as short message service (SMS), multimedia message service (MMS), and instant messaging (IM), has become an important mode of communication for users of wireless and wireline devices. For example, users send SMS messages to each other using mobile telephone handsets. In addition, users send instant messages to each other via the Internet using personal computers. Users also use their mobile telephone handsets and/or personal computers to send video clips and photographs to each other using MMS messages.

One problem associated with current message service message delivery mechanisms is the failure to adequately screen for fraudulent message service messages. As used herein, the term "fraudulent message service message" refers to any message that is sent for an improper purpose by the sender or that is not desired by the intended recipient. Conventional methods for screening SMS messages include determining whether a message is from a subscriber for whom the recipient desires to block SMS traffic and determining whether the number of messages received within a time period exceeds a flooding threshold. While both of these methods work for their intended purposes, each requires screening on a per subscriber basis, which can become cumbersome as the number of subscribers and the volume of message traffic increase. In addition, each of these methods may fail to stop fraudulent message service message traffic that appears to be from an authorized sender and that does not cause a flooding threshold to be exceeded.

Accordingly, in light of these difficulties associated with conventional message service message screening mechanisms, there exists a need for methods, systems, and computer program products for detecting and mitigating fraudulent message service message traffic.

SUMMARY

The subject matter described herein includes methods, systems, and computer program products for detecting and mitigating fraudulent message service message traffic. According to one aspect, a method for detecting fraudulent message service message traffic is provided. The method includes monitoring message service message traffic. It is determined that monitored message service message traffic is fraudulent based on the presence of at least one of: (a) message service message traffic received at a first network from a second network that has a signaling connection control part (SCCP) calling party address internal to the first network, (b) a volume of message service traffic received at the first network from the second network exceeds a volume of message service message traffic sent by the first network to the second network by a threshold amount, and (c) message service message traffic that is sent to a dark number. A mitigating action is performed in response to detecting the fraudulent message service message traffic.

According to another aspect, a method for detecting fraudulent message service message traffic based on analysis of SCCP calling party address network information is provided. The method includes, at a first communications network, monitoring a message service message received from a second communications network, where the message includes a signaling connection control part (SCCP) calling party address (CgPA) parameter. It is determined whether the SCCP CgPA parameter contains an SCCP address that is associated with the first communications network. In response to determining that the SCCP CgPA parameter contains an SCCP address that is associated with the first communication network, a mitigating action is performed.

According to another aspect, a method for detecting fraudulent message service message traffic based on unbalanced message service message traffic flow is provided. The method includes monitoring a number of message service messages received from a communications network. A number of message service messages sent to the communications network is monitored. It is determined whether the number of message service messages received from the communications network and the number of message service messages sent to the communications network differ by at least a threshold amount, where an amount can include an absolute number or a percentage of total message traffic transmitted between the networks. In response to determining that the number of message service messages received from the communications network and the number of message service messages sent to the communications network differ by at least the threshold amount, a mitigating action is performed.

According to yet another aspect, message service message fraud may be detected by dark number analysis. In one exemplary method, a first message service message is observed. The first message includes a message recipient identifier and a message originator identifier. It is determined whether the message recipient identifier is to an unassigned or dark number. In response to determining that the message recipient identifier is an unassigned or dark number, the message originator is identified as a suspicious originator. In response to observing a second message service message sent by the message originator, a mitigating action is performed.

According to yet another aspect, message service message fraud may be detected by observing error messages generated by message service messages that are sent to dark or unassigned numbers. In one exemplary implementation, a method for detecting such fraud may include observing a message service error reporting message that is associated with an attempt to deliver a message service message from a message originator to an unknown subscriber. It is determined whether the message originator has triggered more than a predetermined threshold number of message service error reporting messages. In response to determining that the message originator has triggered more than a predetermined threshold number of message service error reporting messages, a mitigating action is performed.

The subject matter described herein for detecting fraudulent message service messages may be implemented using a computer program product comprising computer executable instructions embodied in a computer readable medium. Exemplary computer readable media suitable for implementing the subject matter described herein includes chip memory devices, disk memory devices, application specific integrated circuits, and programmable logic devices. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 6 is a table illustrating an exemplary table for detecting fraudulent message service message traffic through analysis of SCCP calling party address network information according to an embodiment of the subject matter described herein;

FIG. 11 is a table illustrating exemplary data for identifying fraudulent message service traffic through analysis of balance between ingress and egress message service message traffic at a network according to an embodiment of the subject matter described herein;

DETAILED DESCRIPTION

Figure 1:
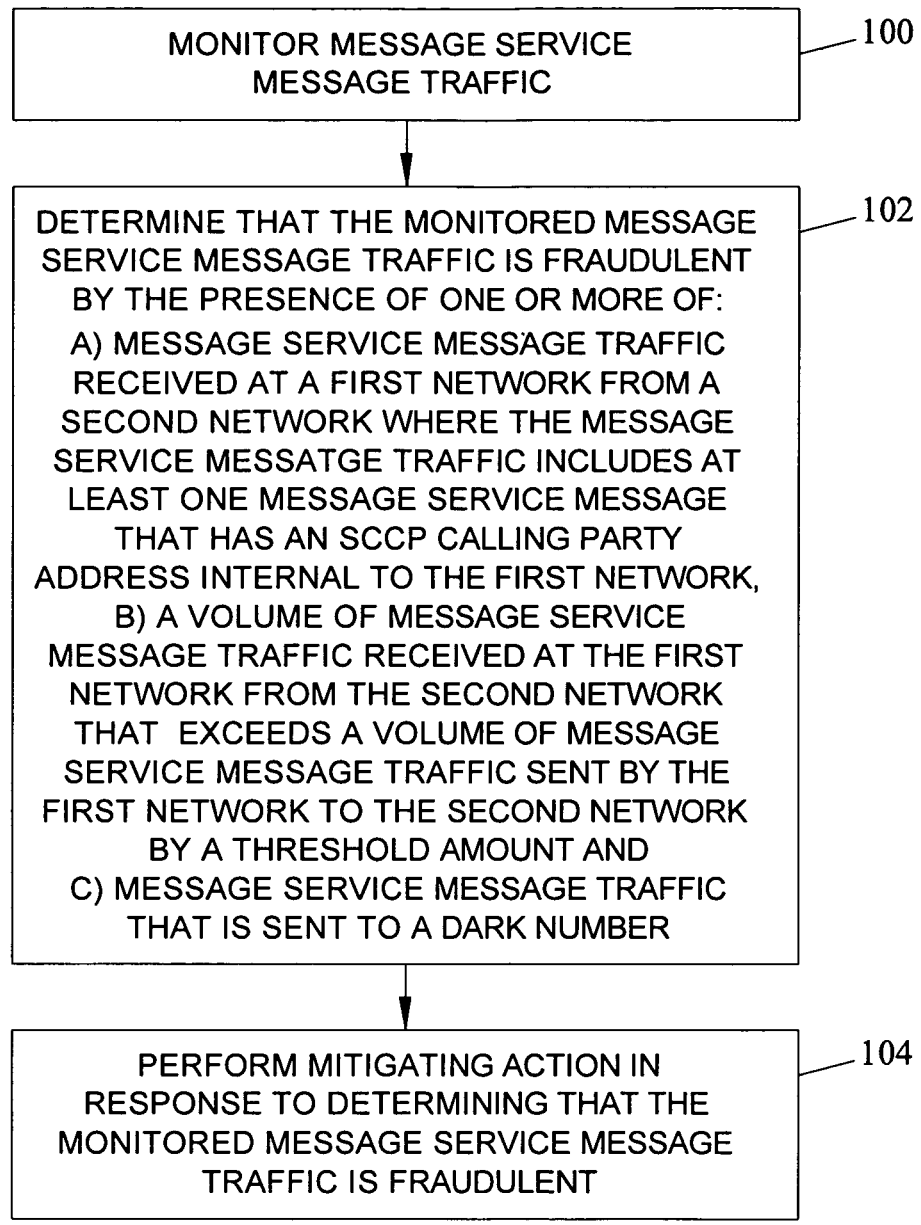
FIG. 1 is a block diagram of exemplary overall steps for a method for detecting fraudulent message service message traffic according to an embodiment of the subject matter described herein.
Figure 2:
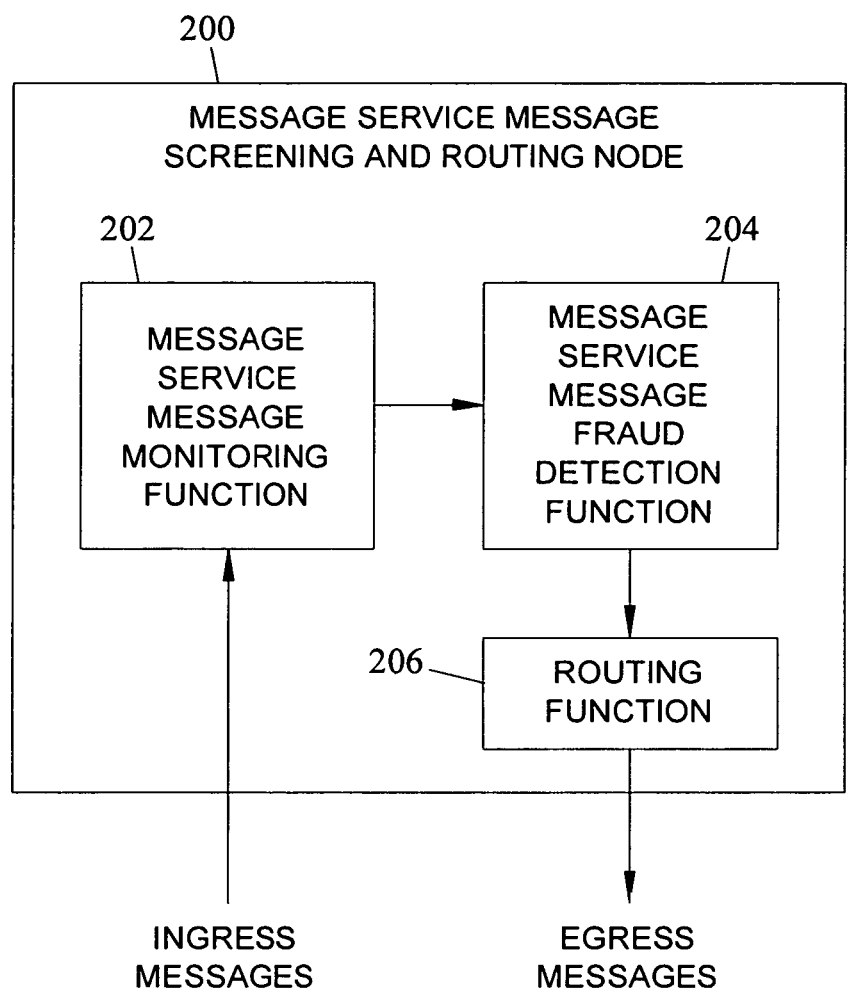
FIG. 2 is a block diagram illustrating an exemplary system for detecting fraudulent message service message traffic according to an embodiment of the subject matter described herein.

The subject matter described herein includes methods, systems, and computer program products for detecting and mitigating fraudulent message service message traffic. FIG. 1 is a flow chart illustrating exemplary overall steps of a method for detecting fraudulent message service message traffic according to an embodiment of the subject matter described herein. Referring to FIG. 1, in step 100, message service message traffic may be monitored. The monitoring of message service message traffic may be performed on actual message service messages that are routed through the network or on copies of those messages. In one implementation, message service messages may be monitored by a routing node that routes signaling messages. FIG. 2 is a block diagram of an exemplary routing node for detecting fraudulent message service messages. In FIG. 2, routing node 200 includes a message service message monitoring function 202 that identifies message service messages from ingress messages.

Returning to FIG. 1, in block 102, it is determined that the monitored message service message traffic is fraudulent based on the presence of at least one of:
  (a) message service message traffic received at a first network from a second network where the message service message traffic includes at least one message that has an SCCP calling party address internal to the first network;
  (b) a volume of message service message traffic received at the first network from the second network that exceeds a volume of message service message traffic sent by the first network to the second network by a threshold amount; and
  (c) message service message traffic that is sent to a dark number.

Returning to FIG. 2, routing node 200 includes a message service message fraud detection function 204 that detects the presence of message service message fraud by one or more of the methods described in block 102 of FIG. 1.

Returning to FIG. 1, in block 104, a mitigating action is performed in response to determining that the monitored message service message traffic is fraudulent. For example, referring to FIG. 2, message service message fraud detection function 204 may take appropriate action based on a determination that the monitored message service message traffic is fraudulent. If the traffic is determined to be fraudulent because a fraudulent SCCP calling party address has been inserted in a message service message, it may be desirable to block message service messages from the sending network that have the identified calling party address. If the traffic is determined to be fraudulent because of an imbalance of message service message traffic between networks, it may be desirable to block all traffic from the network that is sending the higher volume of traffic, as this higher volume may indicate spam. If the traffic is determined to be fraudulent based on messages being directed to a dark number, the sender of such messages may be blocked from sending further message service messages into a network. Each of these fraud detection functions will now be described in more detail.

As stated above, one method for detecting fraudulent message service message traffic includes determining whether the calling party address in a received message is internal and the message was received from an external network. In general, an internal or local SCCP calling party address should not be present in messages coming from an outside network. As such, if an observed message service message is received on a signaling link that is used to connect to an outside or foreign network, and the CgPA parameter value contained within the SCCP part of the message is associated with the local SCCP network entity, the message may be identified as fraudulent.

Figure 3:
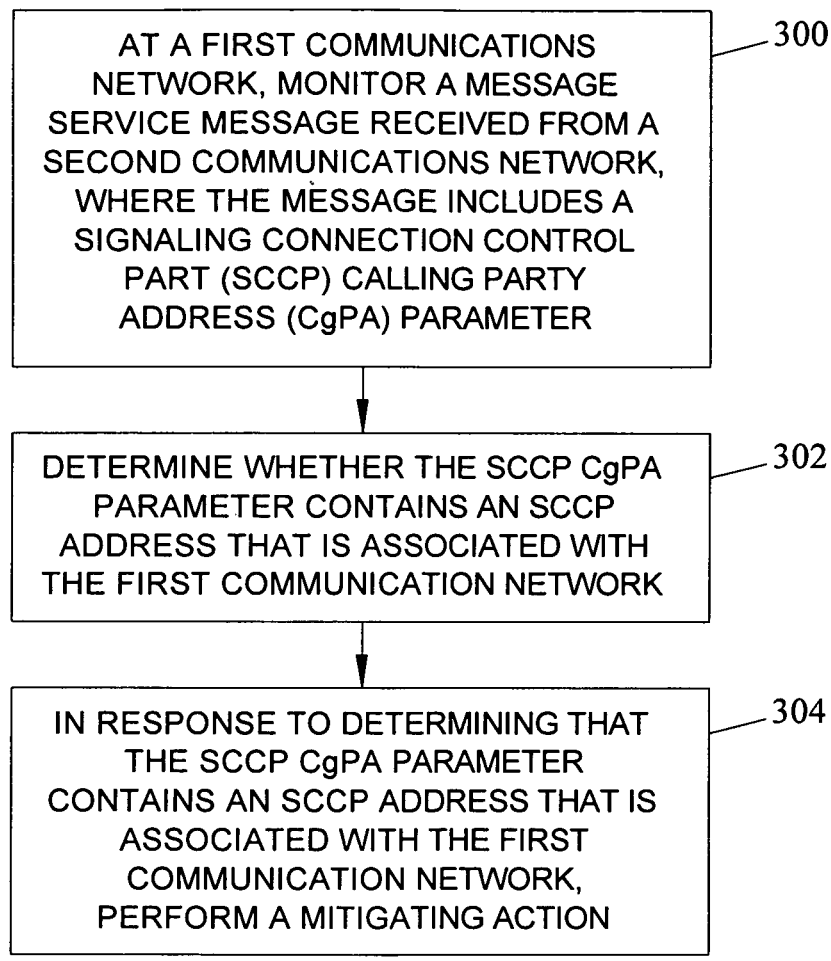
FIG. 3 is a flow chart illustrating exemplary steps for detecting fraudulent message service message traffic through analysis of SCCP calling party address network information according to an embodiment of the subject matter described herein.
Figure 4:
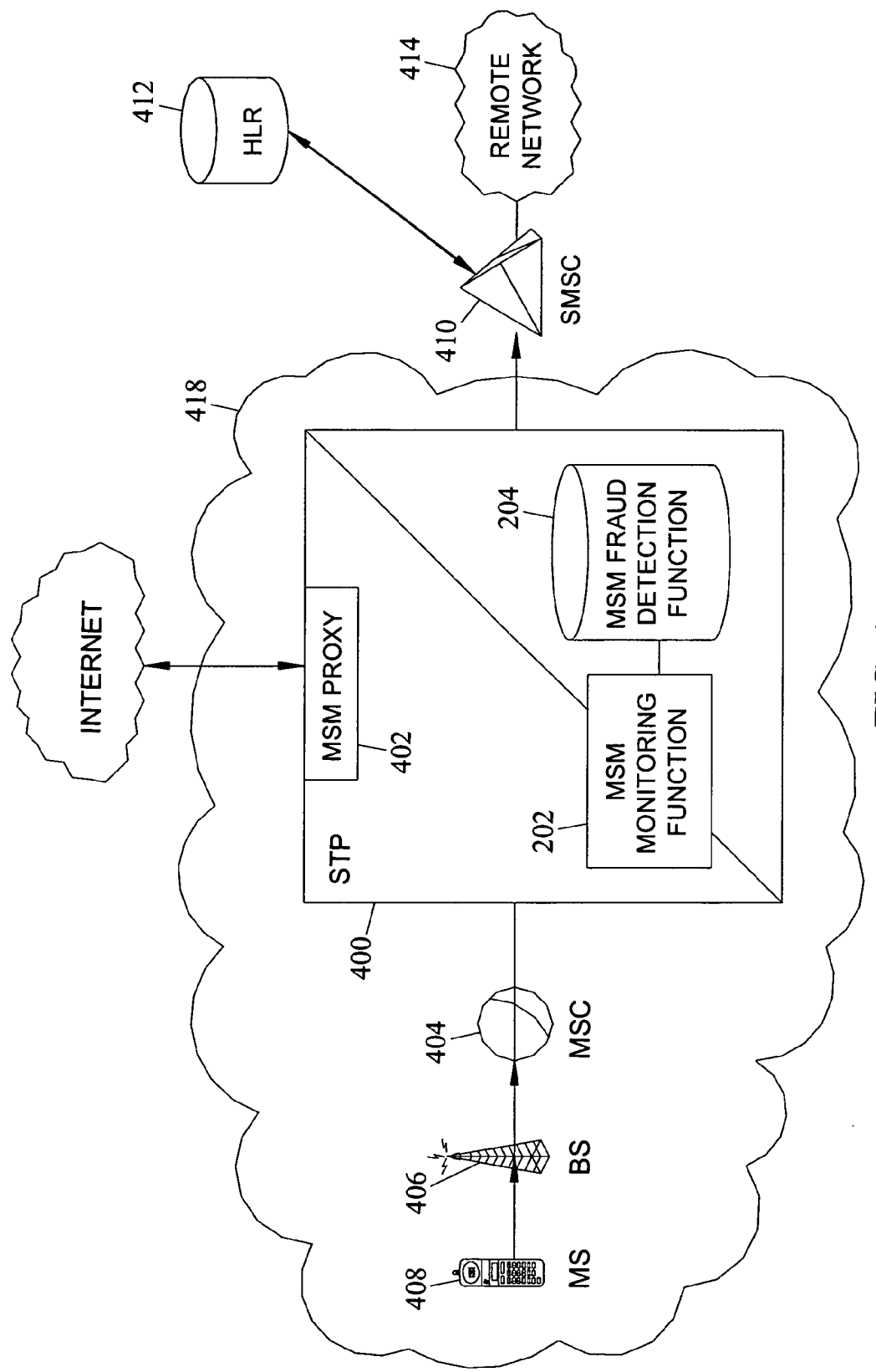
FIG. 4 is a network diagram illustrating exemplary network components for detecting fraudulent message service message traffic according to an embodiment of the subject matter described herein.

FIG. 3 is a flow chart illustrating an exemplary process for screening message service message traffic to determine the presence of message service message fraud through analysis of SCCP calling party address network information according to an embodiment of the subject matter described herein. Referring to FIG. 3, in block 300, at a first communications network, a message service message is monitored. The message service message is received from a second communications network. The message service message includes an SCCP calling party address parameter. FIG. 4 is a block diagram illustrating an exemplary system for detecting fraudulent message service message traffic according to an embodiment of the subject matter described herein. Referring to FIG. 4, a signal transfer point 400 includes monitoring function 202 and message service message fraud detection function 204 described above. Monitoring function 202 may identify received message service message traffic and forward the message service message traffic to fraud detection function 204. STP 400 also includes a message service message proxy 402 for providing message service to subscribers of the Internet. A mobile switching center (MSC) 404 provides switching services for mobile terminal 408, which connects to MSC 404 via base station 406. An SMSC 410 performs store and forward processing for received message service messages. A home location register 412 stores subscriber data and location information.

In operation, when monitoring function 202 receives and identifies a message service message, monitoring function 202 forwards the message to fraud detection function 204. Returning to FIG. 3, in blocks 302 and 304, it is determined whether the SCCP CgPA parameter in the message contains an address that is associated with the first network, and, in response, performing a mitigating action. Referring again to Figure, fraud detection function 204 extracts the SCCP calling party address parameter from the message. Fraud detection function 204 determines whether message is received on a link corresponding to remote network 414 are SCCP calling party addresses that are local to network 418. If a local SCCP calling party address is received on a link corresponding to remote network 414, fraud may be indicated, and message service message screening function 204 may perform an appropriate mitigating action. Exemplary mitigating actions suitable for implementing the subject matter described herein include discarding the message, generating alarm, and/or generating an alert to the network operator or the intended recipient.

Message service messages that are screened for fraud may be transmitted using SS7 message transfer part layers 1-3 or Internet protocol. For example, messages screened by node 400 may be sent over traditional SS7 signaling links or over IP signaling links, using an IETF SIGTRAN SCCP user adaptation layer. The fraud detection performed by the subject matter described herein is independent of the underlying transport layer used to carry message service message traffic through the network.

Figure 5:
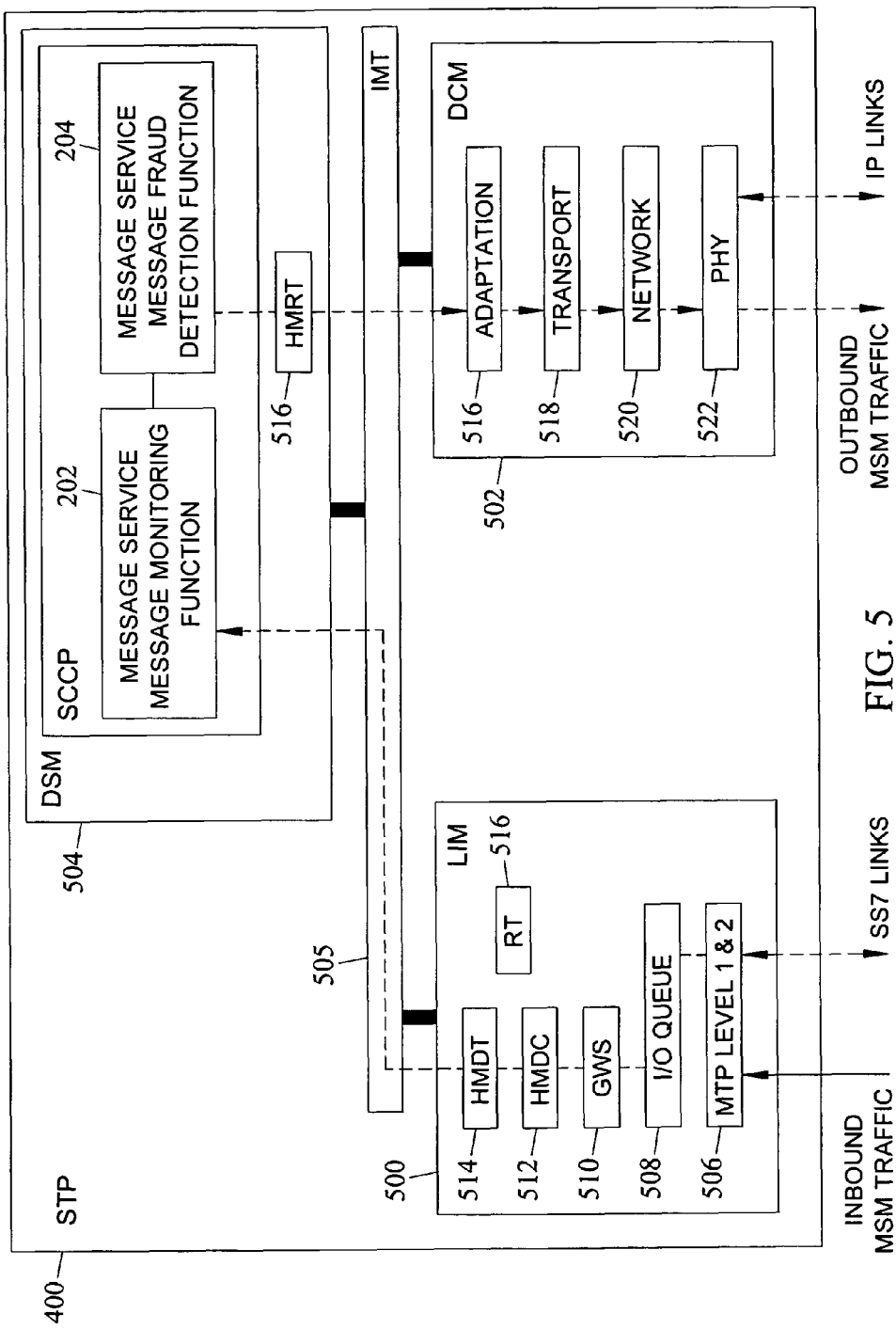
FIG. 5 is a block diagram illustrating an exemplary architecture of a routing node for detecting fraudulent message service message traffic according to an embodiment of the subject matter described herein.

FIG. 5 is a block diagram illustrating exemplary components of STP 400 for identifying fraudulent message service message traffic according to an embodiment of the subject matter described herein. Referring to FIG. 5, STP 400 includes a plurality of modules 500, 502, and 504 connected to each other via a bus 505. Each module 500, 502, and 504 may include a printed circuit board with an application processor and a communications processor mounted thereon. The application processor of each module performs signaling message processing functions, including, in some cases, the identification of fraudulent message service message traffic. The communications processor on each module controls communication with other modules via bus 505.

In the illustrated example, module 500 comprises a link interface module (LIM) for interfacing with SS7 signaling links. LIM 500 includes a message transfer part level 1 and 2 function 506, I/O queue 508, a gateway screening function 510, a discrimination function 512, a distribution function 514, and a routing function 516. MTP level 1 and 2 function 506 performs MTP level 1 and 2 operations for received messages, such as error detection, error correction, and message sequencing. I/O queue 508 queues inbound messages for processing the higher layers. Gateway screening function 510 screens incoming messages to determine whether to allow the messages into the network. Discrimination function 512 determines whether received messages are addressed to STP 400 or are to be through switched. Through switched messages may be forwarded to routing function 516 for distribution to the card or module associated with the outbound signaling link. Messages addressed to STP 400 may be passed to distribution function 514 for forwarding to another module for internal processing.

DCM 502 includes hardware and software for interfacing with IP signaling links. In the illustrated example, only the modules associated with outbound message processing are shown. In particular, DCM 502 includes an adaptation layer function 516 for implementing one of the SIGTRAN protocols for sending SS7 messages over IP links, a transport layer function 518 for performing transport layer functions, such as connection oriented transport of messages over IP, a network layer function 520 for performing network layer functions, such as routing, and a physical layer 522 for performing physical layer functions, such as error detection, error correction, and physical transmission of a message over a signaling link. Transport layer 518 may be implemented using UDP, TCP, or SCTP. Network layer 520 may be implemented using IP. Physical layer 522 may be implemented using a suitable physical layer protocol, such as Ethernet. DCM 502 may also include components 510, 512, 514, and 516 for processing inbound IP encapsulated SS7 messages.

Module 504 comprises a database services module (DSM) for performing database related processing of messages. In one embodiment, database related processing includes identification of message service messages and screening those messages for fraud detection through network analysis of SCCP calling party address network information. In particular, DSM 504 includes message service message monitoring function 202 and message service message fraud detection function 204. In this example, fraud detection function 204 is configured to identify fraudulent message service messages based on the presence of an SCCP calling party parameter that is associated with an internal network when the message is received from an external network.

In operation, when a message service message is received via an SS7 signaling link, it is passed up SS7 protocol the stack to message distribution function 514, which distributes the message to DSM 504 for further processing. Monitoring function 202 identifies the message as a message service message and forwards the message to fraud detection function 204. Fraud detection function 204 performs a lookup to determine whether the SCCP calling party address parameter in the message identifies an internal network when the message is from an external network. In response to determining that an internal SCCP calling party address is received from an external network, fraud detection function 204 may perform a mitigating action, such as discarding the message, generating alert, etc.

FIG. 6 is a table illustrating exemplary data that may be used by fraud detection function 204 in identifying internal SCCP addresses received on external linksets and performing the appropriate actions. In FIG. 6, the first column in the table identifies the linkset on which the message was received. This information may be determined by having the receiving module insert a linkset identifier in the message or any other suitable means by which the receiving linkset may be identified. The second column in the table identifies the SCCP calling party address. In the first entry of the table, the first calling party address is assumed to be an external calling party address. Accordingly, the action identified in the third column is to allow the message. In the second entry in the table, the calling party address is assumed to be an internal calling party address. Accordingly, the action identified in the third column of the table is to block the message.

Returning to FIG. 5, if a message is allowed, it may be passed to routing function 516, which routes the message to its destination via the appropriate link interface module. If the message is blocked, screening function 204 may delete the message and generate a notification to the appropriate party.

Figure 7:
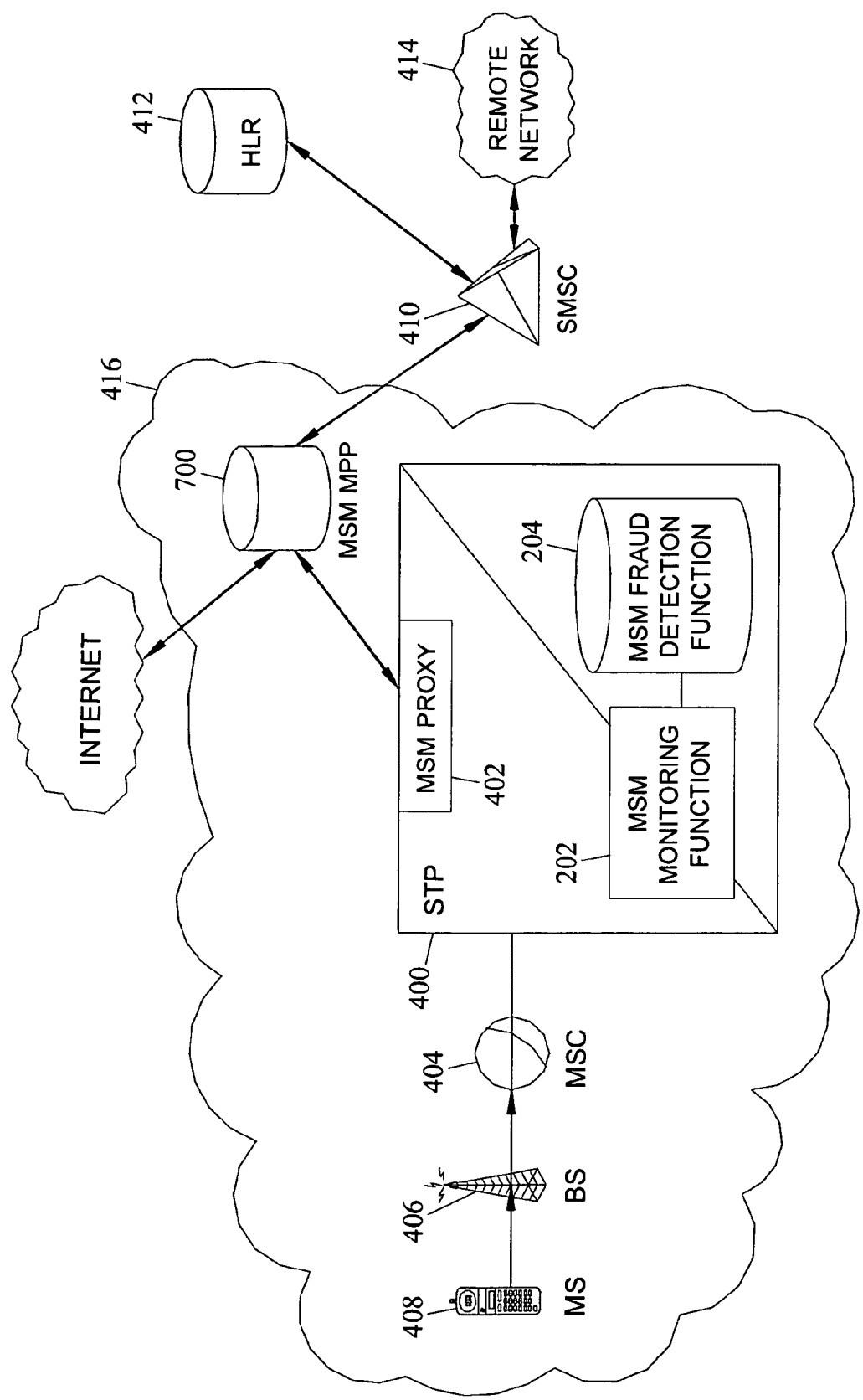
FIG. 7 is a network diagram illustrating alternate network components for detecting fraudulent message service message traffic according to an embodiment of the subject matter described herein.

FIG. 7 is a network diagram illustrating an alternate example of a system for identifying fraudulent message service message traffic according to an embodiment of the subject matter described herein. Referring to FIG. 7, the network includes the same components illustrated in FIG. 4. However, rather than performing message service message fraud detection at STP 400, the detection is performed at a message service message processing platform (MPP) 700.

Figure 8:
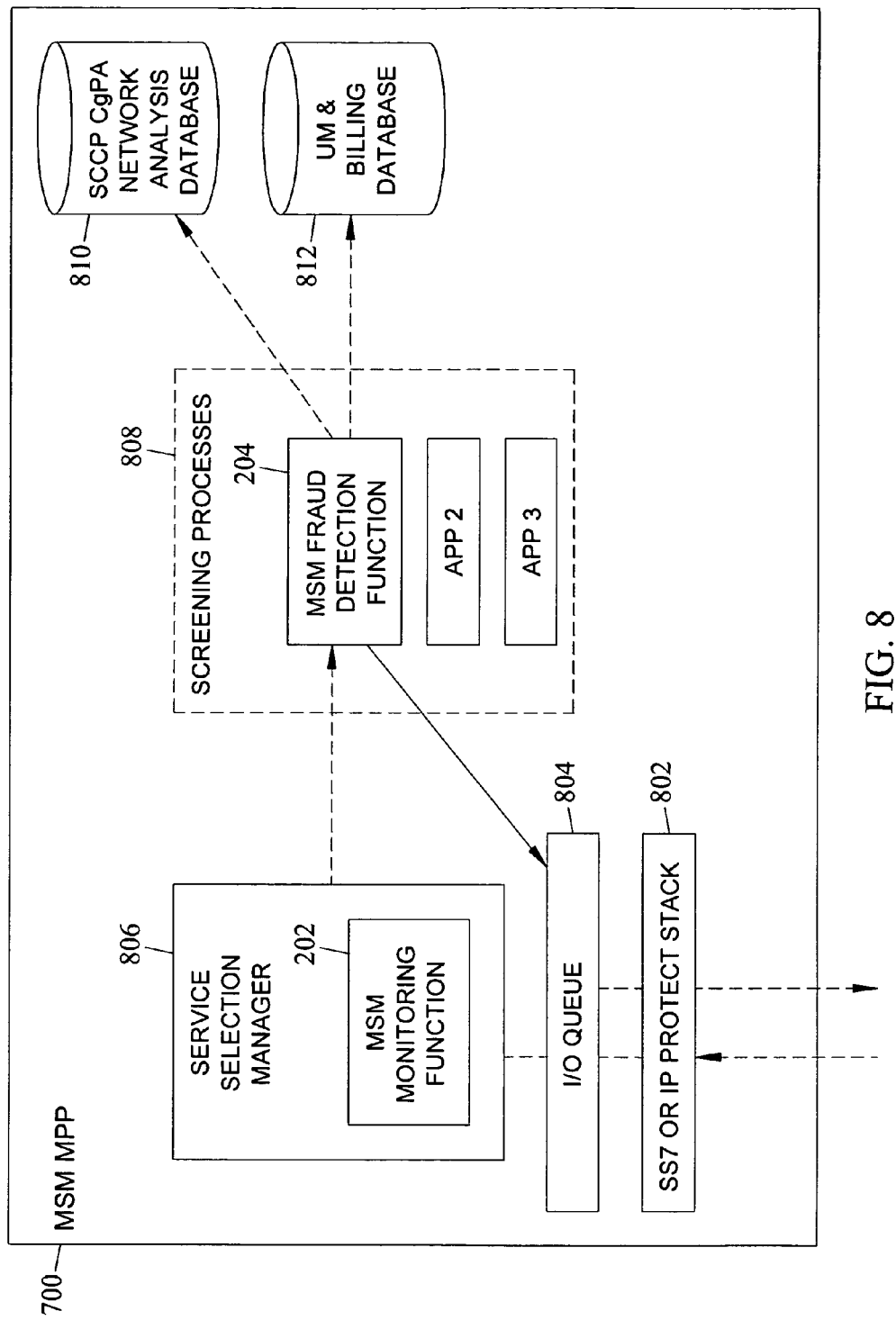
FIG. 8 is a block diagram of a message processing platform for detecting fraudulent message service message traffic according to an embodiment of the subject matter described herein.

FIG. 8 is a block diagram of an exemplary internal architecture of message processing platform 700 according to an embodiment of the subject matter described herein. Referring to FIG. 8, message processing platform 700 includes an SS7 or IP protocol stack 802 for sending and receiving message service messages over an IP network. An I/O queue 804 queues messages for inbound and outbound processing. A service selection manager 806 screens incoming messages to identify the type of service required for the messages. Message service message monitoring function 202 may be implemented as a sub-function of service selection manager 806 for identifying message service messages for a fraud detection function. A plurality of screening processes 808 may screen messages based on the identified service type. In the illustrated example, message service message fraud detection function 204 may be one of the screening processes 808. An SCCP calling party address network analysis database 810 may include data similar to that illustrated in FIG. 6 for screening message service messages. A usage measurements and billing database 812 may also be provided to generate billing data for message service messages that pass screening and are delivered.

In operation, when a message service message is received, it is passed by protocol stack 802 to I/O queue 804. Service selection manager 806 invokes MSM monitoring function 202 to identify the service type required for the message. In this example, the service type is assumed to be MSM fraud detection. Accordingly, the message is passed to MSM fraud detection function 204. MSM fraud detection function 204 performs a lookup in SCCP CgPA network analysis database 810 determine whether the SCCP calling party address in the message corresponds to an internal calling party address received on a link from an external network. If this condition is true, MSM fraud detection function 204 may perform a mitigating action, such as dropping the message. If the message passes, it may be passed by fraud detection function 204 to I/O queue 804 and through protocol stack 802 to be sent over the network to the destination. A billing entry 812 may be modified to indicate that screening has occurred and/or that the message is delivered.

Figure 9:
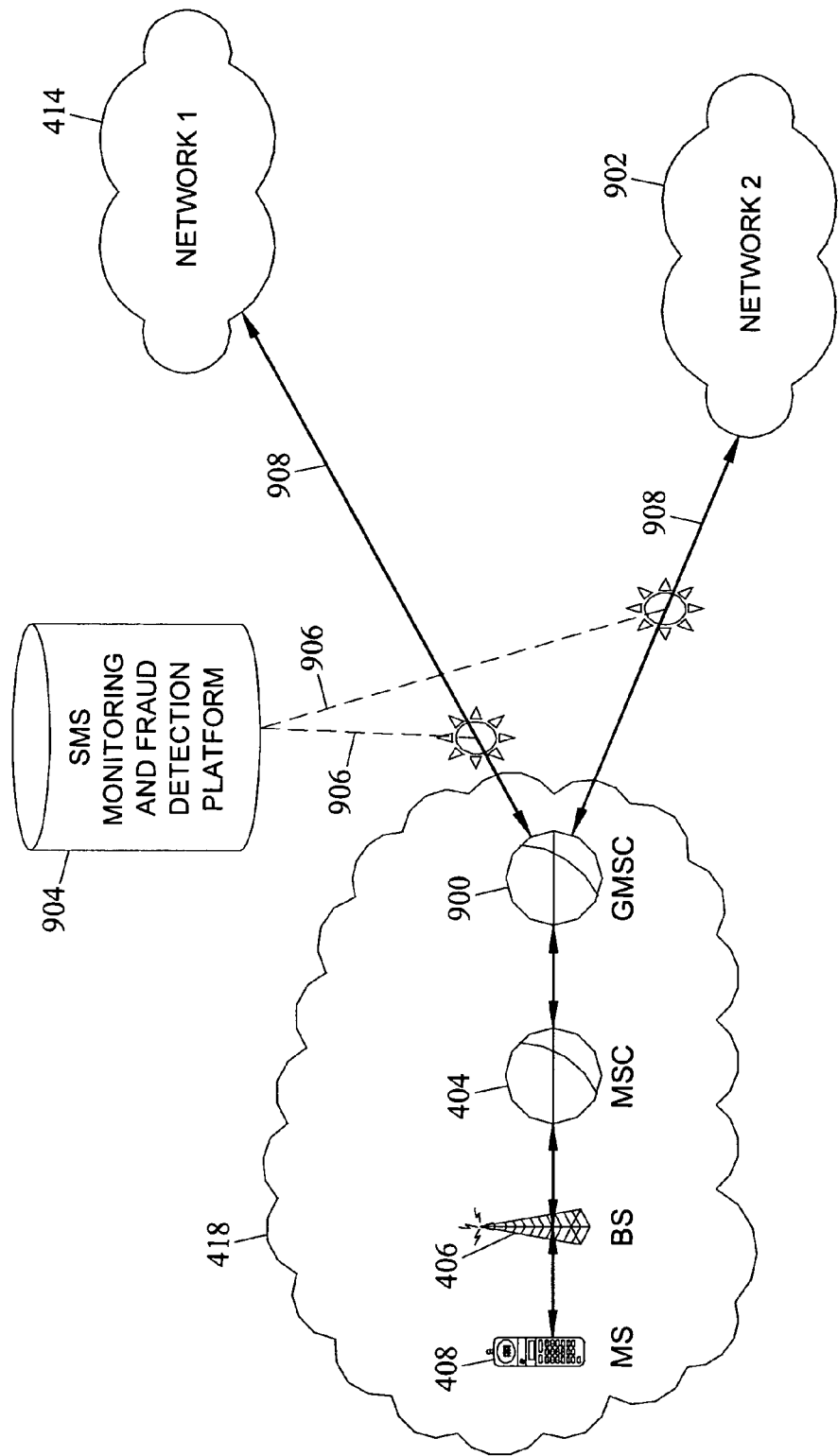
FIG. 9 is a network diagram illustrating an exemplary monitoring system for detecting fraudulent message service message traffic according to an embodiment of the subject matter described herein.

FIG. 9 is a network diagram illustrating yet another embodiment of a system for identifying fraudulent message service message traffic according to an embodiment of the subject matter described herein. Referring to FIG. 9, a network includes components 404, 406, and 408 previously described. In addition, the network includes a gateway mobile switching center 900 that connects network 418 to remote networks 414 and 902. Message service message monitoring and fraud detection may be performed by a message service message monitoring and fraud detection platform 904 that includes functions 202 and 204 described above. In addition, platform 902 includes link probes 906 that passively copy signaling messages that traverse signaling links 908. Thus, rather than screening messages that are actually delivered or not delivered, platform 904 screens signaling message copies, which is less disruptive to message delivery. Other than screening message copies, the operation of platform 904 is the same as that described above with regard to the examples illustrated in FIGS. 3-8.

Figure 10:
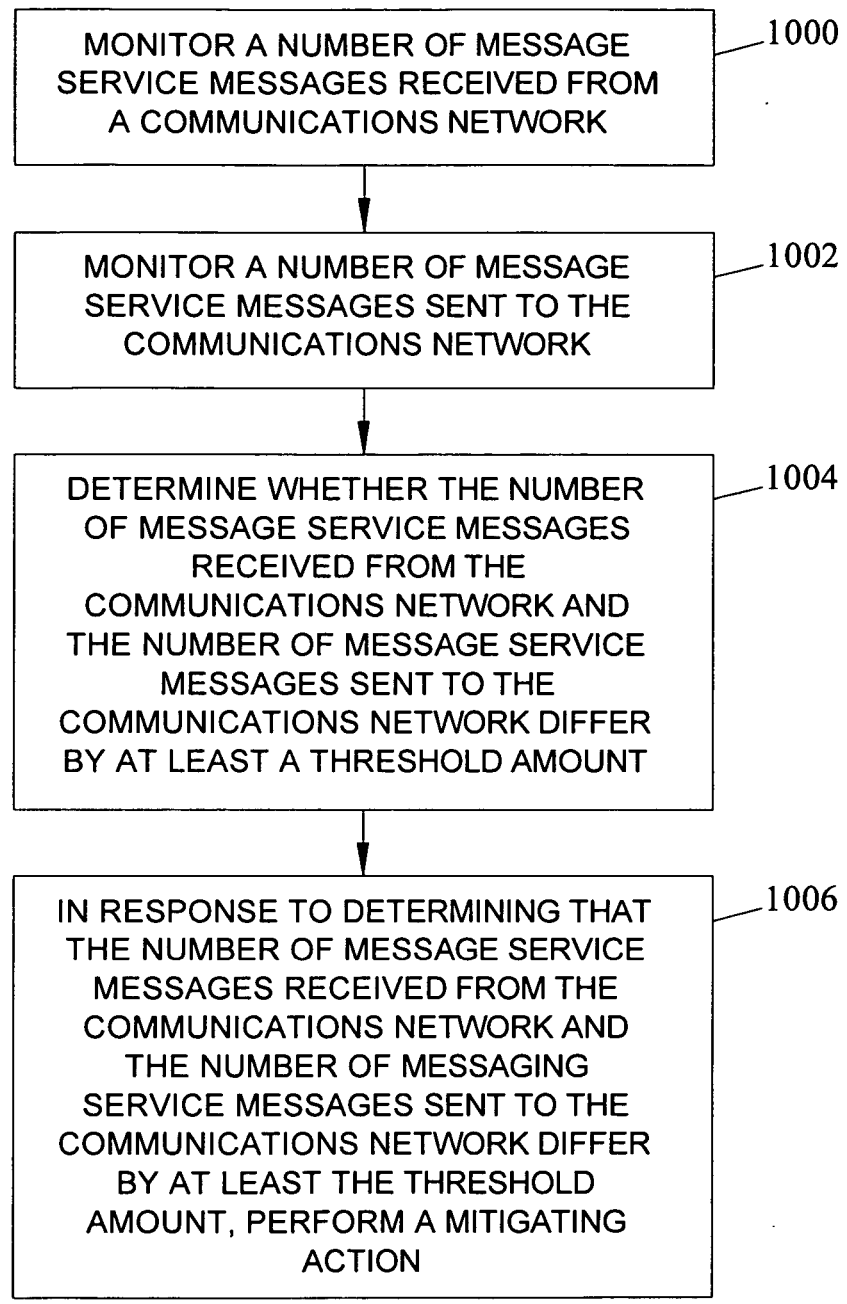
FIG. 10 is a flow chart illustrating exemplary steps for identifying fraudulent message service traffic through analysis of balance between ingress and egress message service message traffic at a network according to an embodiment of the subject matter described herein.

According to another aspect of the subject matter described herein, fraudulent message service message traffic may be indicated by an imbalance in ingress and egress message service message traffic at a network. For example, fraudulent message service message traffic may be identified by monitoring and analyzing the ratio or relative volumes of message service message traffic received from and sent to a remote network. Ingress and egress message service message statistics may be compiled and analyzed for message service message traffic communicated between different network operators. FIG. 10 is a flow chart illustrating exemplary steps for detecting fraudulent message service message traffic based on relative ingress and egress message service message traffic volumes according to an embodiment of the subject matter described herein. Referring to FIG. 10, in step 1000, a number of message service messages received from a communications network is monitored. Referring to the network example illustrated in FIG. 4, fraud detection function 204 may monitor the volume of message service messages received from remote network 414.

Returning to FIG. 10, in step 1002, a number of message service messages sent to the communications network are monitored. For example, in FIG. 4, message service message monitoring function 202 may forward message service messages to fraud detection function 204. Fraud detection function 204 may monitor the number of messages sent to network 414.

Returning to FIG. 10, in step 1004, it is determined whether the number of message service messages received from the communications network and the number of message service messages sent to the communications network differ by at least a threshold amount. Returning to FIG. 4, fraud detection function 204 may determine whether the number of messages sent to network 414 differs from the number of messages received from network 414 by at least a threshold amount. In step 1006, in response to determining that the number of message service messages received from the communications network and the number of message service messages sent to the communications network differ by at least a threshold amount, a mitigating action is performed. For example, in FIG. 4, fraud detection function 204 may perform a mitigating action, such as generating an alarm to the network operator, generating an alert to the intended recipient, and/or discarding the message.

The functionality for detecting message service message fraud through analysis of ingress and egress traffic balance may be implemented on any suitable platform, such as routing node 200 illustrated in FIG. 2, STP 400 illustrated in FIG. 5, MPP 700 illustrated in FIGS. 7 and 8, or monitoring platform 904 illustrated in FIG. 9. Exemplary data for detecting fraudulent message service message traffic through analysis of ingress and egress traffic balance is illustrated in FIG. 11. Referring to FIG. 11, a message service message egress ingress table maintains message counts for messages sent to and from different networks. In particular, the first entry in the table is for network 1. In network 1, egress count for the network exceeds the ingress count by over 100,000 messages. The disparity threshold is 1000. The time period during which the counts are compared is 30 minutes. Thus, when a new message arrives at network 1, the ingress count is incremented. When a new message leaves network 1, the egress count is incremented. A running 30 minute time window is used for the analysis so that the disparity threshold has meaning. Since the ingress and egress counts differ by an amount that is greater than the disparity threshold, the action is triggered. In this example, the action is an alarm. In the second example in the table illustrated in FIG. 11, for network 2, the ingress and egress counts differ by only one. The disparity threshold is a 1000. Accordingly, the mitigating action is not triggered.

According to another aspect of the subject matter described herein, fraudulent message service message traffic may be identified by analyzing patterns of message service messages that are sent to unassigned or dark numbers. The dark number may be an MSISDN number or other mobile identification number that has not been assigned to a mobile subscriber. In one implementation, a network operator may reserve one or more mobile identification numbers for the purpose of assisting and identifying fraudulent message service messages. That is, the one or more mobile identification numbers within a range of assignable numbers may intentionally be unassigned for the purpose of detecting fraudulent message service message traffic.

Figure 12:
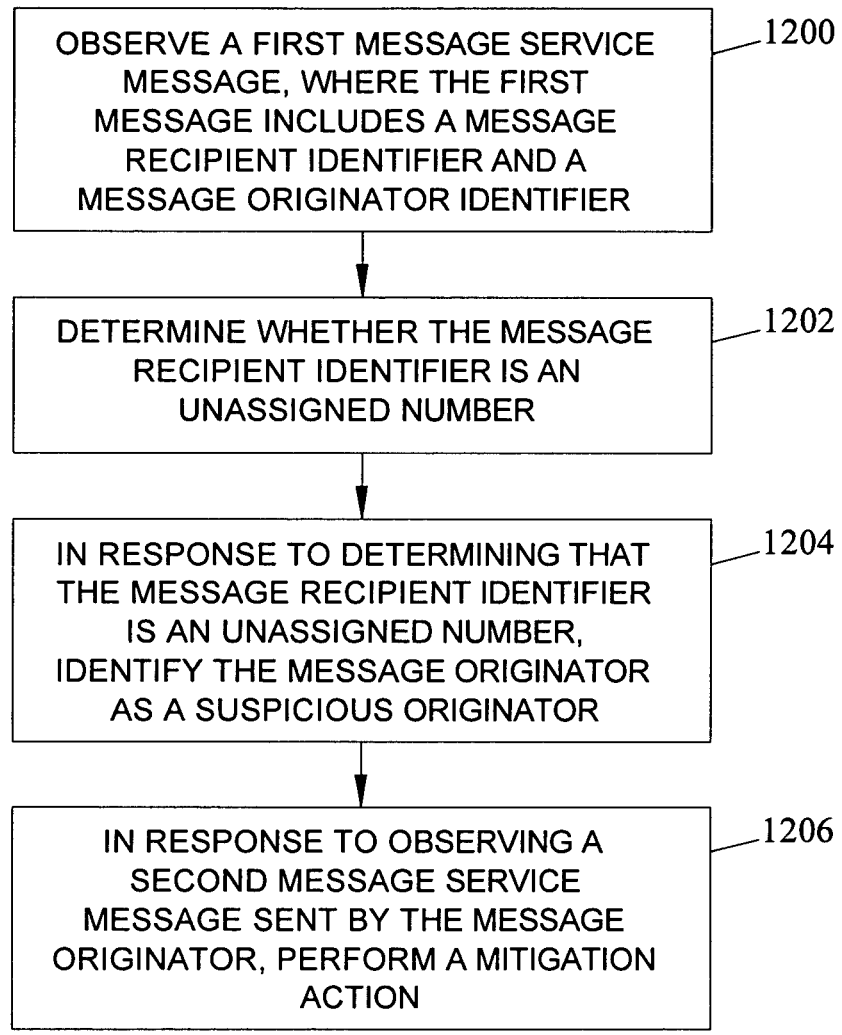
FIG. 12 is a flow chart illustrating an exemplary method for identifying fraudulent message service message traffic using dark or unassigned number analysis according to an embodiment of the subject matter described herein.

FIG. 12 is a flow chart illustrating exemplary steps for detecting fraudulent message service message traffic based on messages sent to unassigned or dark numbers according to an embodiment of the subject matter described herein. Referring to FIG. 12, in step 1200, a first message service message is observed. The first message service message includes a recipient identifier and an originator identifier. Referring to FIG. 4, fraud detection function 204 may receive a message and identify the recipient and originator identifier. In step 1202, it may be determined whether the message recipient identifier corresponds to an unassigned number. Returning to FIG. 4, fraud detection function 204 may access a database of unassigned numbers that are intentionally unprovisioned by the network operator for purposes of fraud detection.

In step 1204, in response to determining that the message recipient identifier is an unassigned number, the message originator may be identified as a suspicious originator. Returning to FIG. 4, fraud detection function 204 may identify the message originator as suspicious because the message originator sent a message to an unassigned number.

In step 1206, in response to receiving a second message service message sent by the message originator, a mitigating action may be performed. For example, referring to FIG. 4, once a message originator sends a message to unassigned number, fraud detection function 204 may provision a database so that further messages from that originator may be blocked, alerts may be generated, or other mitigating actions may be performed.

In one implementation, SMS fraud detection application 204 may include a database or table that contains a list of unassigned or dark mobile identification numbers. Fraud detection application 204 may also include a message buffer that temporarily buffers at least a portion of one or more of the monitored message service messages. Fraud detection application 204 may examine message recipient information contained in an observed message service message and determine whether the message recipient identifier is included in the dark number list. If so, fraud detection application 204 may extract message originator identification information from the message and place the message originator identifier in a suspicious originator list. The message originator identifier contained in the suspicious originator list may be compared to message originator identifiers associated with message service messages stored in the temporary buffer. If a predetermined number of matches are found, then a mitigating action may be performed. Mitigating actions may include, but are not limited to, discarding or blocking transmission of the message service message and subsequent message service messages from the offending message service message originator, generating an alarm, or generating an alert notification message that may be sent to a network operation's staff member.

Subsequently received message service messages may be examined by fraud detection application 204 to determine whether the message originator associated with each observed message service message is contained in the suspicious originator list. If a predetermined number of message service messages are observed from a message originator that is contained in the suspicious originator list, then messages from that message originator may be blocked or discarded and alarms may be generated.

The subject matter for detecting message service message fraud based on messages sent to dark or unassigned numbers can be implemented using any suitable platform, such as routing node 200 illustrated in FIG. 2, STP 400 illustrated in FIG. 4, message processing platform 700 illustrated in FIGS. 7 and 8, or monitoring and fraud detection platform 904 illustrated in FIG. 9.

Figure 13:
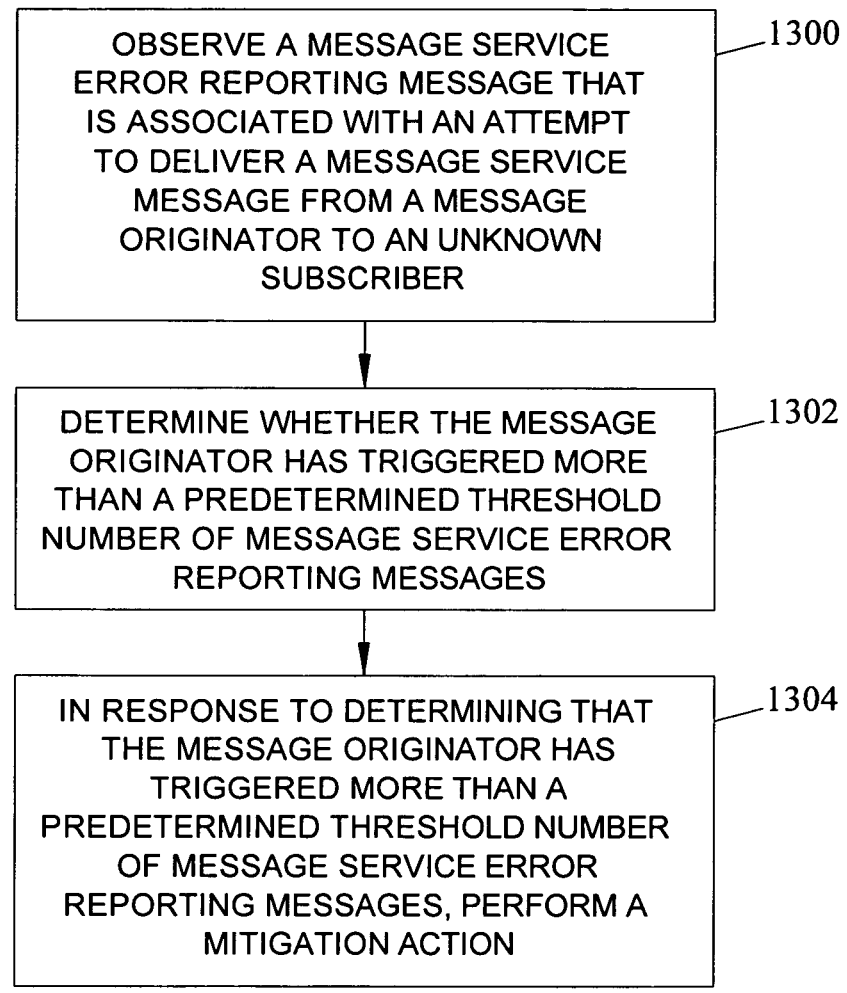
FIG. 13 is a flow chart illustrating exemplary steps for identifying fraudulent message service message traffic using dark or unassigned number analysis according to an embodiment of the subject matter described herein.

According to another aspect of the subject matter described herein, fraudulent message service message traffic sent to unassigned numbers may be identified based on the presence of error messages generated in response to messages sent to unknown subscribers. FIG. 13 is a flow chart illustrating exemplary steps for detecting message service message fraud based on messages sent to unknown subscribers. Referring to FIG. 13, in step 1300, a message service message error reporting message that is associated with an attempt to deliver a message service message from a message originator to an unknown subscriber may be received. For example, fraud detection function 204 illustrated in FIG. 4 may detect SMS error messages that are sent in response to an SMS message that is sent to an unknown subscriber. Such error messages may be triggered by the SMSC. In step 1302, it is determined whether the message service message has triggered more than a threshold number of error messages. For example, in FIG. 4, fraud detection function 204 may maintain a number of error messages generated for different subscribers. In step 1304, in response to determining that the message originator has triggered more than the predetermined threshold of error messages, a mitigating action may be performed. For example, in FIG. 4, fraud detection function 204 may block future messages from the originator or notify the network operator.

In one implementation, fraud detection function 204 may observe MAP FailureReport messages and maintain counts or statistics associated with the number of failure report messages that report an unknown subscriber error. If the number of failure report messages exceeds a predetermined threshold value, then a mitigating action may be performed. Mitigating actions may include, but are not limited to, discarding or blocking transmission of subsequent message service messages from the originator or the message service message that triggered the failure report messages, generating an alarm, or generating an alert notification message that may be sent to a network operation staff member. The functionality for detecting message service message fraud based on error messages, such as failure report messages may be implemented using any suitable platform, such as routing node 200 illustrated in FIG. 2, STP 400 illustrated in FIG. 4, message processing platform 700 illustrated in FIGS. 7 and 8, or monitoring and fraud detection platform 904 illustrated in FIG. 9.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting fraudulent message service message traffic, the method comprising:
   (a) monitoring message service message traffic, wherein the message service message traffic includes at least one of short message service, multimedia message service, and instant message traffic;
   (b) determining that the monitored message service message traffic is fraudulent based on the presence message service message traffic that is sent to a dark number, wherein the dark number comprises a mobile identification number that is not assigned to a mobile subscriber by a mobile network operator, wherein determining that the monitored message service message traffic is fraudulent based on the presence of message service message traffic that is directed to a dark number includes performing a lookup in a dark number database that contains a list of unassigned mobile identification numbers; and
   (c) performing a mitigating action in response to determining that the monitored message service message traffic as fraudulent.

2. A method for detecting fraudulent message service message traffic in a communications networking environment, the method comprising:
   (a) observing a first message service message, wherein the first message includes a message recipient identifier and a message originator identifier, and wherein the message service message includes a short message service message, a multimedia message service message, or an instant message;
   (b) determining whether the message recipient identifier is an unassigned number, wherein the unassigned number includes a mobile identification number that is not assigned to a mobile subscriber by a mobile network operator;
   (c) in response to determining that the message recipient identifier is an unassigned number, identifying the message originator as a suspicious originator; and
   (d) in response to observing a second message service message sent by the message originator, performing a mitigating action.

3. The method of claim 2 wherein performing a mitigating action includes generating an alarm.

4. The method of claim 2 wherein performing a mitigating action includes generating an alert notification message.

5. A system for detecting fraudulent message service message traffic in a communications networking environment, the system comprising:
   a printed circuit board;
   at least one processor mounted on the printed circuit board;
   a message service message monitoring function implemented by the at least one processor for monitoring message service message traffic, wherein the message service message traffic includes at least one of short message service traffic, multimedia message service traffic, and instant message traffic;
   a message service message fraud detection function implemented by the at least one processor for identifying the monitored message service message traffic as fraudulent based on the presence of message service message traffic that is sent to a dark number, wherein the dark number comprises a mobile identification number that is not assigned to a mobile subscriber by a mobile network operator, wherein determining that the monitored message service message traffic is fraudulent based on the presence of message service message traffic that is directed to a dark number includes performing a lookup in a dark number database that contains a list of unassigned mobile identification numbers; and
   wherein the message service message fraud detection function is adapted to perform a mitigating action in response to identifying the monitored message service message traffic as fraudulent.

6. A system for detecting fraudulent message service message traffic in a communications networking environment, the system comprising:
   a printed circuit board;
   at least one processor mounted on the printed circuit board;
   a message service message monitoring function implemented by the at least one processor for monitoring message service messages, wherein the message service messages include at least one of short message service messages, multimedia message service messages and instant messages; and
   a message service message fraud detection function implemented by the at least one processor for analyzing message service messages monitored by the monitoring function, for the determining whether a message recipient identifier contained in a first message service message from a message originator is an unassigned mobile subscriber number, wherein the unassigned mobile subscriber number includes a mobile identification number that is not assigned to a mobile subscriber by a mobile network operator, in response to determining that the recipient identifier in the first message service message is an unassigned mobile subscriber number, for determining whether subsequent message service messages sent by the message originator are directed to the unassigned mobile subscriber number and, in response to determining that subsequent message service messages sent by the message originator are directed to the unassigned mobile subscriber number, for performing a mitigating action, wherein determining that the monitored message service message traffic is fraudulent based on the presence of message service message traffic that is directed to a dark number includes performing a lookup in a dark number database that contains a list of unassigned mobile identification numbers.

7. A computer program product comprising computer executable instructions embodied in a non-transitory computer-readable medium for performing steps comprising:

monitoring message service message traffic, wherein the message service message traffic includes at least one of short message service, multimedia message service, and instant message traffic;

determining that the monitored message service message traffic is fraudulent based on the presence of message service message traffic that is sent to a dark number, wherein the dark number comprises a mobile identification number that is not assigned to a mobile subscriber by a mobile network operator; and performing a mitigating action in response to identifying the message service message traffic as fraudulent, wherein determining whether the message service message traffic is directed to a dark number includes performing a lookup in a dark number database that contains a list of unassigned mobile identification numbers.

* * * * *